United States Patent
Seeberg et al.

(10) Patent No.: US 10,533,669 B2
(45) Date of Patent: Jan. 14, 2020

(54) BI-DIRECTIONAL FLOW CONTROL VALVE (71) Applicant: Baker Hughes, Houston, TX (US)

(72) Inventors: Bjørn Erik Seeberg, Oslo (NO); Paal Martin Vagle, Oslo (NO)

(73) Assignee: Baker Hughes, a GE Company, LLC, Houston, TX (US)

(*) Notice: Subject to any disclaimer, the term of this patent is extended or adjusted under 35 U.S.C. 154(b) by 123 days.

(21) Appl. No.: 15/829,708

(22) Filed: Dec. 1, 2017

(65) Prior Publication Data
US 2018/0156342 A1  Jun. 7, 2018

Related U.S. Application Data (60) Provisional application No. 62/428,915, filed on Dec. 1, 2016.

(51) Int. Cl.
F16K 7/17 (2006.01)
F16K 31/126 (2006.01)
(Continued)

(52) U.S. Cl.
CPC ............ *F16K 7/17* (2013.01); *F16K 17/28* (2013.01); *F16K 31/1266* (2013.01);
(Continued)

(58) Field of Classification Search
CPC ......... Y10T 137/7727; Y10T 137/7785; Y10T 137/7792; Y10T 137/7835;
(Continued)

(56) References Cited

U.S. PATENT DOCUMENTS 2,037,425 A * 4/1936 Martin ............... G01L 19/0046
73/706
2,687,745 A * 8/1954 Hackett ................ F16K 17/285
137/460
(Continued)

FOREIGN PATENT DOCUMENTS

WO   03/071173 A1   8/2003

OTHER PUBLICATIONS

International Search Report and Written Opinion issued in connection with corresponding PCT Application No. PCT/US2017/064366 dated Mar. 19, 2018.

*Primary Examiner* — William M McCalister
(74) *Attorney, Agent, or Firm* — Mintz Levin Cohn Ferris Glovsky and Popeo, P.C.

(57) ABSTRACT

Methods, systems, and devices are provided for controlling fluid flow in a pressure sensing system. A bi-directional valve can include a first capillary that can couple to a process fluid in a process fluid channel, and a second capillary that can couple to a pressure sensor. The first and second capillaries can include an interface therebetween for controlling fluid flow between the first and second capillaries. The interface region can be configured to allow fluid flow between the first and second capillaries when a magnitude of a pressure difference between the first capillary and the second capillary is less than or equal to a threshold pressure. The interface region can also be configured to prevent fluid flow between the first capillary and the second capillary when the magnitude of the pressure difference between the first capillary and the second capillary exceeds than the threshold pressure.

20 Claims, 9 Drawing Sheets (51) Int. Cl.
*E21B 47/06* (2012.01)
*E21B 17/00* (2006.01)
*G01L 19/00* (2006.01)
*F16K 17/28* (2006.01)

(52) U.S. Cl.
CPC ...... *G01L 19/0015* (2013.01); *G01L 19/0046* (2013.01); *E21B 17/00* (2013.01); *E21B 47/06* (2013.01)

(58) Field of Classification Search
CPC ..... Y10T 137/7836; F16K 7/17; F16K 17/26; F16K 31/1266; F16K 17/28; G01L 19/0015; G01L 19/0046; G05D 7/0635; E21B 17/00; E21B 47/06
USPC .......... 137/509, 510, 460, 498, 504
See application file for complete search history.

(56) References Cited

U.S. PATENT DOCUMENTS

| | | | | |
|---|---|---|---|---|
| 2,938,538 | A * | 5/1960 | Allen | G05D 7/0113 137/504 |
| 2,992,652 | A * | 7/1961 | Fellberg | B60T 11/326 137/118.03 |
| 3,110,527 | A * | 11/1963 | Fox | F16C 32/0648 137/504 |
| 3,207,179 | A * | 9/1965 | Klagues | F16K 17/04 137/513.3 |
| 3,288,578 | A * | 11/1966 | Witt | F16K 17/19 137/467 |
| 3,760,638 | A * | 9/1973 | Lawson | G01L 7/00 73/706 |
| 4,022,244 | A * | 5/1977 | Oman | F16K 15/144 137/517 |
| 4,059,017 | A * | 11/1977 | Settlemyer | F16K 17/04 137/540 |
| 4,186,768 | A * | 2/1980 | Kuester | F16K 17/26 102/416 |
| 4,196,753 | A * | 4/1980 | Hammarstedt | G05D 7/0113 138/43 |
| 4,210,172 | A * | 7/1980 | Fallon | B67D 1/12 137/504 |
| 4,241,757 | A * | 12/1980 | Bron | G05D 7/0113 137/501 |
| 4,586,383 | A * | 5/1986 | Blomquist | G01F 15/185 374/188 |
| 5,062,448 | A * | 11/1991 | Hilsenbeck | F16K 17/26 137/498 |
| 5,101,854 | A * | 4/1992 | Bron | A61M 5/16881 137/501 |
| 5,163,920 | A * | 11/1992 | Olive | A61M 5/14276 128/DIG. 12 |
| 5,241,984 | A * | 9/1993 | Onjohji | F16K 17/28 137/460 |
| 5,301,713 | A * | 4/1994 | Skoglund | G05D 7/0126 137/504 |
| 5,336,166 | A * | 8/1994 | Sierra | A61M 27/006 137/498 |
| 5,780,748 | A * | 7/1998 | Barth | F15C 5/00 137/98 |
| 5,988,211 | A * | 11/1999 | Cornell | G05D 7/0113 137/501 |
| 6,203,523 | B1 * | 3/2001 | Haller | A61M 5/14276 604/131 |
| 6,896,002 | B2 * | 5/2005 | Hart | A61M 5/168 137/625.5 |
| 7,389,788 | B2 * | 6/2008 | Wilson | A61B 5/0215 137/112 |
| 7,581,559 | B2 * | 9/2009 | Bausmith, III | A61M 39/223 137/512 |
| 7,610,936 | B2 * | 11/2009 | Spohn | A61M 5/007 137/877 |
| 7,775,237 | B2 * | 8/2010 | Keren | F16K 15/141 137/488 |
| 2006/0108004 | A1 * | 5/2006 | Nakamura | B41J 2/17596 137/510 |
| 2009/0314093 | A1 * | 12/2009 | Hausler | G01L 19/0663 73/717 |
| 2011/0232388 | A1 | 9/2011 | Butterfield | |
| 2011/0282276 | A1 * | 11/2011 | Abal | A61M 5/14212 604/33 |
| 2013/0047737 | A1 | 2/2013 | Vagle et al. | |
| 2013/0178752 | A1 * | 7/2013 | Kodama | A61B 5/0235 600/498 |
| 2014/0298914 | A1 * | 10/2014 | Vagle | G01L 19/00 73/716 |

* cited by examiner

BI-DIRECTIONAL FLOW CONTROL VALVE

CROSS-REFERENCE TO RELATED APPLICATIONS

This application claims the benefit of priority of U.S. Provisional Patent Application No. 62/428,915, filed Dec. 1, 2017, and entitled "Bi-Directional Flow Control Check Valve," the entirety of which is incorporated by reference.

BACKGROUND

Fluids (e.g., liquids and gases) can be conveyed through subsea pipes for long-distance transportation and distribution. The surrounding marine environment can expose the pipes to a variety of, and sometimes relatively aggressive, service conditions and it can cause leaks to form in the pipes. For example, pipes can be breached due to mechanical forces (e.g., impact from other equipment or remotely operated vehicles (ROVs) during operation, fatigue from motion water, etc.), corrosion, or other surrounding conditions. Pipes can be monitored for leaks in order to prevent pipe damage and deterioration, for example, in order to comply with environmental regulations.

In order to control flow within a network of pipes, pressure can be measured at a variety of locations. In general, a pressure measurement can be performed by placing a pressure sensor in contact with the fluid. The sensor can include a sensing element that moves in response to changes in fluid pressure, and the sensor can convert the movements into another type of output (e.g., mechanical, electrical, etc.) that can be calibrated to provide a measurement of the fluid pressure.

In subsea oil installations and processing facilities, pressure measurements can be obtained at a location remote from the location where the measurement is desired. In one example, long lines containing a transmission fluid, such as a hydraulic oil, can be employed to communicate the pressure of a process fluid to a remote pressure gauge. A seal can be used to separate the process fluid to be measured from the transmission fluid flowing through the lines. The seal can transfer the pressure from the process fluid to the transmission fluid, which in turn can transfer the pressure of the process fluid to the pressure gauge at the remote location. Even under circumstances where a pressure sensor is positioned very close to the location of the process fluid, there can be a distance between a location where the process fluid enters the pressure sensor and a sensing element that measures the pressure. For example, a hydraulic differential pressure sensor operates under the same principles as discussed above, except that the length of the lines containing the transmission fluid are shorter.

These distances separating the fluid under pressure from the sensing element of the pressure sensor can present challenges for pressure measurements in subsea oil installations and processing facilities. In general, the diameter of the lines carrying the transmission fluid can be small compared to the diameter of a pipe carrying the process fluid. While the total volume of transmission fluid carried in the lines can be large compared to the volume displacement (e.g., travel) that the seal can achieve without rupture, the seal can include a seat on the transmission fluid side of the seal to prevent excess displacement of the seal beyond this safe limit. However, any damage to the transmission lines carrying the transmission fluid can circumvent this protection. Where the pressure of the surrounding environment is less than the pressure of the process fluid, damage to the lines containing the transmission fluid can provide an outlet for the transmission fluid to leak to the surrounding environment. Alternatively, where the pressure of the surrounding environment is greater than the pressure of the process fluid, any damage to the lines containing the transmission fluid can lead to rupture of the seal. Once the seal is ruptured, the transmission fluid, and potentially fluids from the surrounding environment, can mix with the process fluid. Furthermore, should the pressure of the surrounding environment decrease below that of the process fluid after the seal is ruptured, the transmission fluid, and possibly the process fluid itself, can leak to the surrounding environment.

SUMMARY

In general, devices, systems, and methods are provided for controlling fluid flow in a pressure sensing system.

In one embodiment, a valve is provided for use in a pressure sensing system and it can include a housing that includes a first capillary portion and a second capillary portion that are separated by an interface region. The valve can also include a deformable member positioned within the interface region, where the deformable member is configured to move between a first position and a second position when a magnitude of a pressure difference between the first capillary portion and the second capillary portion exceeds a threshold pressure. In the first position, the deformable member can allow fluid communication between the first capillary portion and the second capillary portion, and in the second position the deformable member can prevent fluid communication between the first capillary portion and the second capillary portion.

The deformable member can have a variety of configurations. In one embodiment, the deformable member can be spaced apart from the first capillary and the second capillary in the first position, and the deformable member can block an opening to one of the first capillary and the second capillary in the second position to prevent fluid flow therethrough. In certain aspects, the deformable member can be configured to deform during movement from the first position to the second position. The deformable member can have a variety of shapes, and in one embodiment the deformable member can be substantially planar in the first position and it can be substantially non-planar in the second position.

In another embodiment, the deformable member can include at least one opening extending therethrough for allowing fluid flow therethrough when the deformable member is in the first position. The at least one opening can be, for example, at least one cut-out formed in a perimeter of the deformable member.

In another embodiment, the deformable member can be positioned within the interface region such that the deformable member is separated from the first capillary portion by a first gap and the deformable member is separated from the second capillary portion by a second gap. The deformable member can be configured to deform toward one of the first gap and the second gap in the second position to prevent fluid communication between the first capillary portion and the second capillary portion.

In one embodiment, a fluid pressure sensing system is provided and it can include a first capillary extending from an interface region of a valve and configured to extend to a process fluid channel, and a second capillary extending between the interface region of the valve and a pressure sensor. The system can also include a first seal configured to transmit a pressure of a process fluid contained within the process fluid channel to a transmission fluid contained within the first capillary, and a second seal at the interface region in hydraulic communication with the first capillary and the second capillary. The second seal can be configured to allow fluid flow between the first capillary and the second capillary when a magnitude of a pressure difference across the second seal is less than or equal to a threshold pressure. The second seal can also be configured to prevent fluid flow between the first capillary and the second capillary when the magnitude of the pressure difference across the second seal is greater than the threshold pressure.

In another embodiment, the fluid pressure sensing system can include the pressure sensor and it can be configured to measure the process fluid pressure when the fluid flows between the first capillary and the second capillary.

The first and second seals can have a variety of configurations. In one embodiment, the first seal can be a diaphragm seal. The second seal can be deformable and it can move between a first position and a second position. In the first position, the second seal can allow fluid flow between the first capillary and the second capillary. In the second position, the second seal can prevent fluid flow between the first capillary and the second capillary. The second seal can be spaced apart from the first capillary and the second capillary in the first position. The second seal can deform toward one of the first capillary and the second capillary to block fluid flow between the first capillary and the second capillary in the second position. In certain aspects, the second seal can be substantially planar in the first position and it can be substantially non-planar in the second position.

In another embodiment, the second seal can be a deformable member having at least one opening extending therethrough for allowing fluid flow between the first capillary and the second capillary when a magnitude of a pressure difference across the second seal is less than or equal to a threshold pressure.

Methods for controlling fluid flow in a pressure sensing system are also provided. In one embodiment, a method can include coupling a valve to a pressure sensing system such that a first capillary extends from the valve and a second capillary extends between the valve and a pressure sensor. The valve can allow a transmission fluid in the first capillary to flow between the first capillary and the second capillary to the pressure sensor when a magnitude of a pressure difference between the first capillary and the second capillary is less than or equal to a threshold pressure. The valve can prevent flow of the transmission fluid between the first capillary and the second capillary when the magnitude of the pressure difference between the first capillary and the second capillary exceeds the threshold pressure.

In one embodiment, the transmission fluid can flow through at least one opening in a deformable member in the valve when the magnitude of the pressure difference between the first capillary and the second capillary is less than or equal to the threshold pressure. In another embodiment, a deformable member in the valve can deform when the magnitude of the pressure difference between the first capillary and the second capillary exceeds the threshold pressure to prevent the transmission fluid from flowing between the first capillary and the second capillary.

BRIEF DESCRIPTION OF THE DRAWINGS

Embodiments of the present disclosure can be more fully understood from the following detailed description taken in conjunction with the accompanying drawings, in which.

It is noted that the drawings are not necessarily to scale. The drawings are intended to depict only typical aspects of the subject matter disclosed herein, and therefore should not be considered as limiting the scope of the disclosure. In the drawings, like numbering represents like elements between the drawings.

DETAILED DESCRIPTION

Methods, systems, and devices are provided for controlling fluid flow in a pressure sensing system, and in particular for sealing at least a portion of the system in the event of damage to the pressure sensing system. In a pressure sensing system, a pressure of a fluid in a pipe can be measured and monitored using a pressure sensor. A pressure of the fluid in the pipe can be transferred through a seal to a transmission fluid. A pressure sensor in communication with the transmission fluid can sense the pressure of the transmission fluid, thereby sensing the pressure of the fluid. In the event of any damage to the pressure sensor, the transmission fluid can leak to the surrounding environment. This can also potentially lead to leakage of the fluid within the pipe. Accordingly, in an exemplary embodiment, a bi-directional valve can be provided for use in a pressure sensing system to prevent leakage of a transmission fluid to a surrounding environment. Under normal operating conditions, the valve can have an open configuration to allow the transmission fluid to transfer pressure from a fluid in a pipe to a pressure sensor. In the event of damage, the bi-directional valve can move to a closed configuration to prevent at least a portion of the transmission fluid from leaking to a surrounding environment. This can also help prevent leaking of the fluid in the pipe to a surrounding environment. Other embodiments are within the scope of the disclosed subject matter.

In certain exemplary embodiments, a bi-directional valve can be provided for controlling fluid flow through a capillary extending between a pressure sensor and a seal extending across an opening in a process fluid channel containing a process fluid. In particular, the bi-directional valve can be configured to seal at least a portion of the capillary to help prevent further leakage of the transmission fluid and to help prevent rupture of the seal and leakage of the process fluid. The bi-directional valve can include a deformable member that can be configured to control fluid flow between a first tubular member and a second tubular member, such as a first capillary and a second capillary. The first capillary can extend between the deformable member and a seal extending across an opening in a process fluid channel having a process fluid flowing therethrough. The second capillary can extend between the deformable member and a pressure sensor. When a magnitude of a difference between a fluid pressure in the first capillary and a fluid pressure in the second capillary is less than or equal to a selected threshold pressure, the deformable member can allow fluid to flow between the first and second capillaries. When a magnitude of a difference between a fluid pressure in the first capillary and a fluid pressure in the second capillary exceeds the threshold pressure, the deformable member can be configured to block fluid flow between the first and second capillaries, thereby sealing one of the first and second capillaries. Other embodiments are within the scope of the disclosed subject matter.

Figure 1:
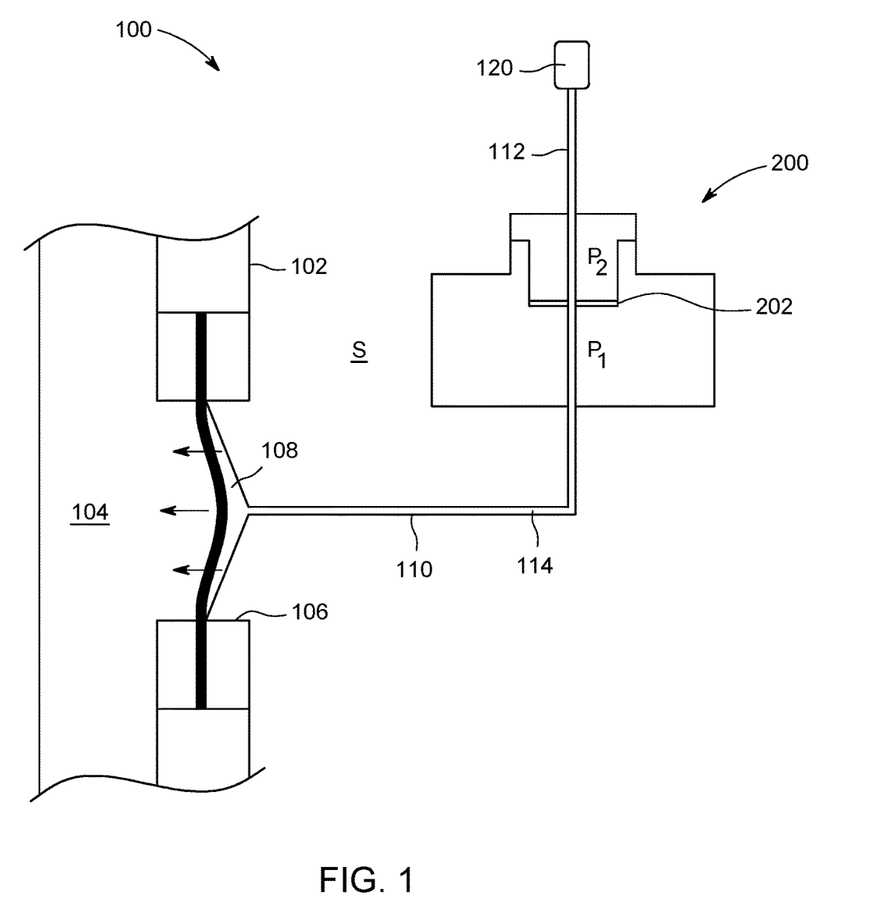
FIG. 1 is a schematic cross-sectional view of one exemplary embodiment of a pressure sensing system having a bi-directional valve shown in an open configuration for measuring a pressure of a process fluid.
Figure 2:
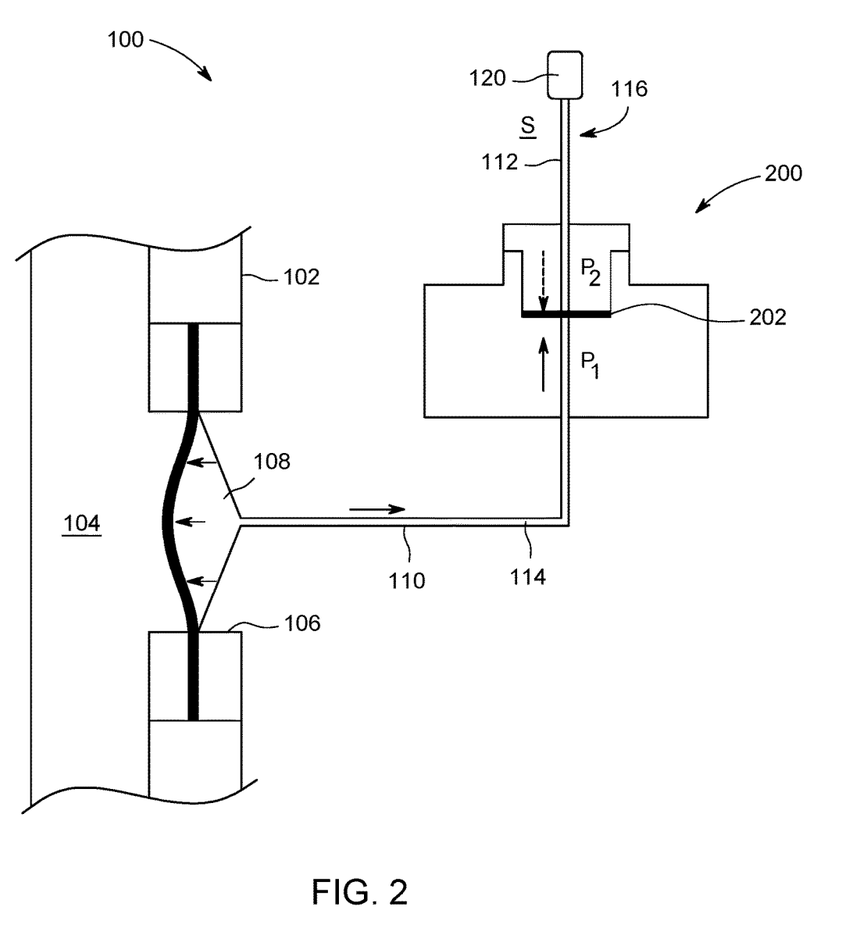
FIG. 2 is a schematic cross-sectional view of the pressure sensing system of FIG. 1, with the bi-directional valve in a closed position to prevent fluid flow therethrough.

FIGS. 1-2 illustrate an exemplary embodiment of a pressure sensing system 100 having a bi-directional valve 200 coupled thereto. The pressure sensing system 100 can be configured to measure a pressure of a process fluid 104 (e.g., oil or gas) flowing through a process fluid channel 102 (e.g., a pipe or pipeline) positioned within a surrounding environment S (e.g., a subsea environment). An opening 106 can be formed in a sidewall of the process fluid channel 102 and a process fluid seal 108 can extend across the opening 106. The pressure sensing system 100 can be used for measuring any process fluid in any structure, and various techniques other than an opening 106 and process fluid seal 108 can be used to transfer a pressure of a process fluid to a transmission fluid. As further shown in FIGS. 1 and 2, a portion of a capillary, referred to as a first capillary 110, can be coupled between the process fluid seal 108 and the bi-directional valve 200, and another portion of a capillary, referred to as a second capillary 112, can extend between the bi-directional valve 200 and a pressure sensor 120. The first and second capillaries 110, 112 can include a transmission fluid 114, such as hydraulic oil, disposed therein. The process fluid seal 108 can be a membrane that can function as a physical barrier that separates the process fluid 104 from the transmission fluid 114 in the first and second capillaries 110, 112. The process fluid seal 108 can be configured to hydraulically transmit a pressure of the process fluid 104 to the transmission fluid 114. The transmission fluid 114 can transfer the process fluid pressure through the first capillary 110, the bi-directional valve 200, and the second capillary 112 to the pressure sensor 120 for measurement. The pressure sensor 120 can be any device capable of sensing a pressure and providing an output representative of the sensed pressure (e.g., a voltage).

The bi-directional valve 200 can control the flow of transmission fluid 114 between the first capillary 110 and the second capillary 112. While exemplary embodiments of the bi-directional valve 200 are discussed in more detail below, in general the bi-directional check 200 can include an interface region 202 having a deformable member (not shown in FIGS. 1 and 2) disposed between the first capillary 110 and the second capillary 112 for controlling fluid flow between the first capillary 110 and the second capillary 112. As shown in FIG. 1, the fluid pressure within the first capillary 110 is given by $P_1$ and the fluid pressure within the second capillary 112 is given by $P_2$. Under normal operating conditions, when the magnitude of the pressure difference across the interface region 202 (a net pressure $\Delta P$) is less than or equal to a threshold pressure $P_T$, the deformable member can be configured to permit hydraulic communication between the first capillary 110 and the second capillary 112. In this configuration, the pressure on each side of the deformable member can equilibrate (e.g., $P_1=P_2$) and the pressure of the process fluid 104 can be measured by the pressure sensor 120.

In some embodiments, the first capillary 110 may be shielded from the external environment by a coupling, making the second capillary 112 more susceptible to damage. In the embodiments, the valve 200 can provide additional protection in the event of damage to the system. FIG. 2 illustrates an embodiment where the damage can be in the form of a breach 116 formed in the second capillary 112. Under these circumstances, the pressure $P_2$ within the second capillary 112 can correspond to the pressure of the surrounding environment S, while the pressure $P_1$ within the first capillary 110 can correspond to the pressure of the process fluid 104, as transmitted by the transmission fluid 114. If the magnitude of the pressure difference across the interface region 202 (the net pressure $\Delta P$) exceeds the threshold pressure $P_T$, the deformable member can be configured to move to a configuration that blocks fluid flow between the first capillary 110 and the second capillary 112. In this manner, the deformable member can act to seal the transmission fluid 114 within the first capillary 110 and prevent leakage of the transmission fluid 114 into the surrounding environment S through the breach 116. Sealing the first capillary 110 may also help prevent leakage of the process fluid 104. In particular, if the magnitude of the net pressure $\Delta P$ is sufficiently large, the process fluid 104 can rupture the process fluid seal 108 and escape into the surrounding environment S.

Figure 3:
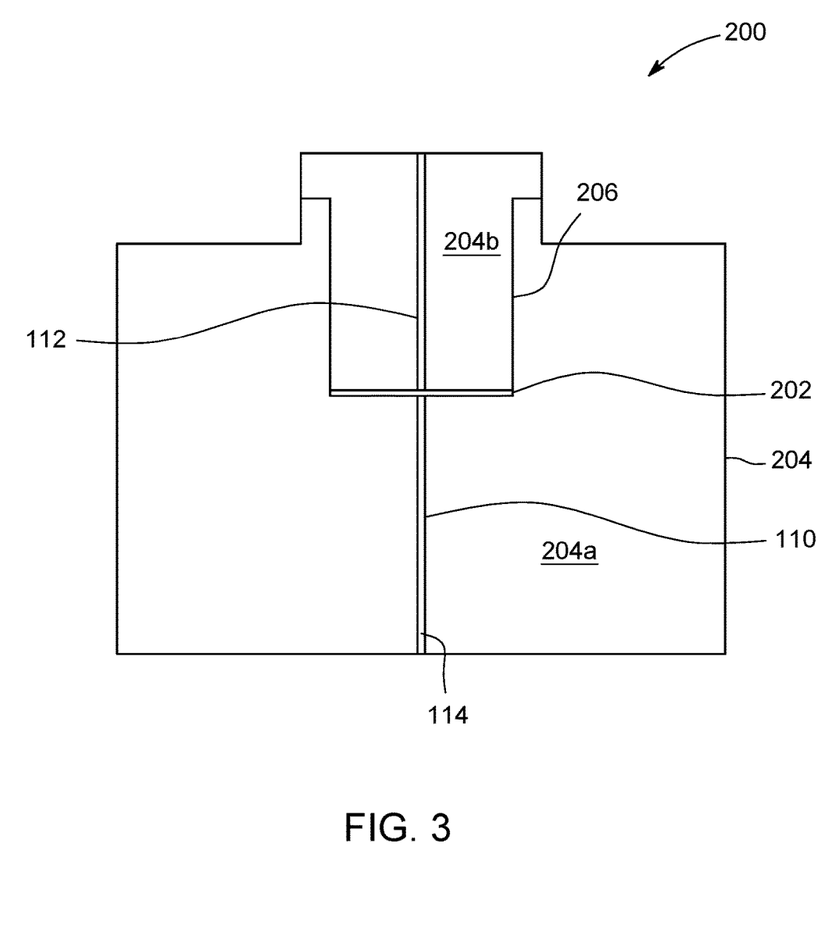
FIG. 3 is a schematic cross-sectional view of the bi-directional valve of FIG. 1.

FIG. 3 illustrates the bi-directional valve 200 of FIGS. 1 and 2 in more detail. As shown, the bi-directional valve 200 can include a housing 204 having at least a portion of each of the first capillary 110 and the second capillary 112 extending therethrough. The interface region 202 can be positioned between the first capillary 110 and the second capillary 112.

The housing 204 can have a variety of configurations and it can be positioned at various locations within a pressure sensing system. As shown in FIG. 3, the housing 204 can include a first housing portion 204a having at least a portion of the first capillary 110 extending therethrough, and a second housing portion 204b having at least a portion of the second capillary 112 extending therethrough. Additionally, while FIG. 3 illustrates a single capillary leading toward the bi-directional valve 200 and a single capillary leading away from the bi-directional valve 200, additional capillaries can lead toward and/or away from the bi-directional valve 200.

As further shown in FIG. 3, the first housing portion 204a can include a cavity 206 formed therein for receiving at least a portion of the second housing portion 204b. The shape of the cavity 206 can be complementary to the shape of the portion of the second housing portion 204b received in the cavity 206. In an exemplary embodiment, inner sidewalls of the cavity 206 can be configured to sealingly engage outer sidewalls of the second housing portion 204b to form a sealed engagement therebetween. While not shown, a sealed engagement between the first housing portion 204a and second housing portion 204b can be provided using any one or more of a mechanical interlock such as a friction fit, a sealing element such as a gasket or sealing ring, and any chemical seal such as an adhesive, and combinations thereof.

As indicated above, the housing 204 can be positioned at various locations within a pressure sensing system. For example, the housing 204 can be configured to mount directly to a process fluid channel, such as process fluid channel 102 shown in FIGS. 1 and 2. In other aspects, the housing 204 can be positioned a distance apart from a process fluid channel, as shown in FIGS. 1 and 2 where housing 204 is spaced a distance from process fluid channel 102. In other embodiments, the housing can be an integral part of a process fluid channel, such as process fluid channel 102, with the interface region 202 being formed in a sidewall of the process fluid channel 102 adjacent to the process fluid seal 108. Moreover, while first and second housing portions 204a, 204b are shown, the housing 204 can be formed as a unitary housing having an interface region formed therein and positioned between the first and second capillaries 110, 112.

The housing 204 can also be made from any material or combination of materials. For subsea applications, the housing 204 can be made from materials possessing suitable chemical and mechanical properties. Suitable chemical properties can include, but are not limited to, corrosion resistance. Suitable mechanical properties can include, for example, strength (e.g., tensile strength, compression strength), fatigue life, and erosion resistance. Suitable materials can include, but are not limited to, metals and metal alloys (e.g., steel, brass, aluminum, titanium), polymers (e.g., polyethylene, polytetrafluoroethylene (PTFE), polyetheretherketone (PEEK)), engineering ceramics (zirconium oxide, aluminum oxide, composites (polymer-reinforced carbon fiber), and combinations thereof. In an exemplary embodiment, the housing 204 can be formed from a stainless steel.

As indicated above, the interface region 202 can extend between the first housing portion 204a and the second housing portion 204b. The interface region 202 can have a variety of configurations, and in one embodiment it can be in the form of a gap formed between a bottom surface of the cavity 206 in the first housing portion 204a and a bottom surface of the second housing portion 204b. The height and width of the gap defining the interface region 202 can vary depending on the configuration of the deformable member extending across the interface region 202, as will be discussed in more detail below. In an exemplary embodiment, the interface region 202 can have a height that is sufficient to allow the deformable member to move between open and closed configurations, as is also discussed below.

Figure 4:
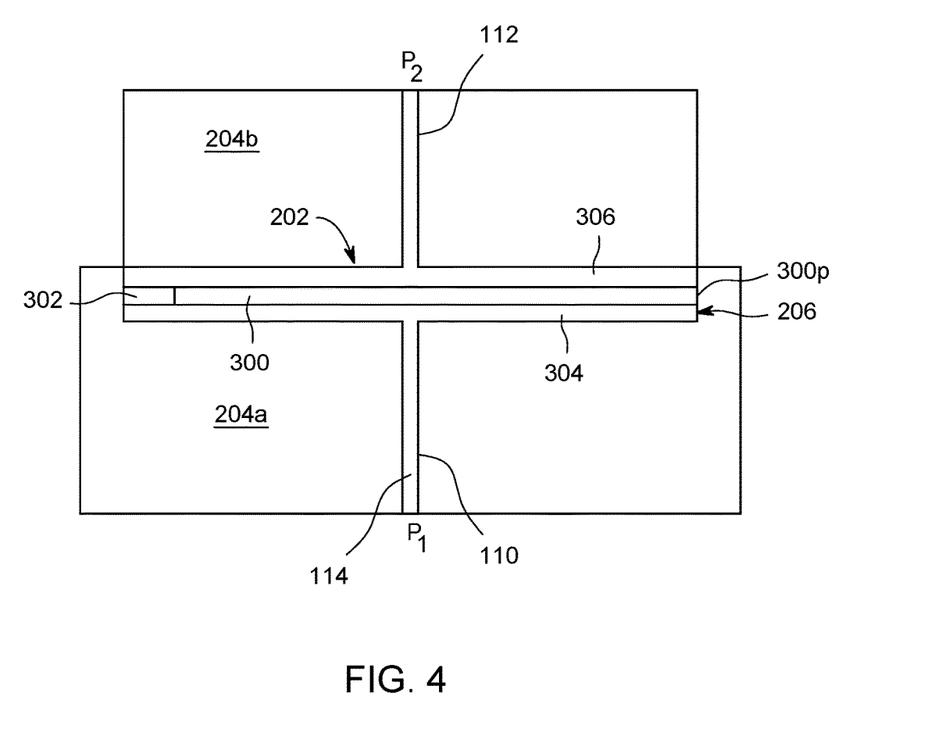
FIG. 4 is a schematic cross-sectional view of an interface region of the bi-directional valve of FIG. 3.

FIG. 4 illustrates one exemplary embodiment of the interface region 202. As shown, the interface region 202 can be in the form of a gap formed between the first housing portion 204a and the second housing portion 204b (only a portion of each of the first and second housing portions 204a, 204b is shown in FIG. 4), as explained above. A deformable member 300 can extend across the interface region 202 and thus between the first capillary 110 and the second capillary 112. As a result, the deformable member 300 can be subjected to a pressure $P_1$ of the transmission fluid 114 in the first capillary 110 and a pressure $P_2$ of the transmission fluid 114 in the second capillary 112.

The deformable member 300 can be positioned across the middle of the gap defined by the interface region 202, such that a first gap 304 extends between the bottom surface of the cavity 206 in the first housing portion 204a and one side of the deformable member 300, and a second gap 306 extends between the bottom surface of the second housing portion 204b and the deformable member 300. The first gap 304 can be in fluid communication with the first capillary 110 and the second gap 306 can be in fluid communication with the second capillary 112. As will be discussed in more detail below, the first gap 304 and the second gap 306 can allow the deformable member 300 to deform and move between different positions to control fluid flow across the bi-directional valve 200. Also, as described more fully below, some embodiments of the deformable member 300 can include cut-outs, such as cut-out 302.

An outer perimeter 300p of the deformable member 300 can be secured to the inner sidewall of the cavity 206 in the first housing portion 204a to maintain the deformable member 300 across t the gap defined by the interface region 202, for example, across the mid portion. Various mating techniques can be used to attach the deformable member 300 to the first housing portion 204a, such as an adhesive, a mechanical connection including a flange disposed within a recess, or any other techniques for maintaining the deformable member 300 within the gap defined by the interface region 202.

The configuration of the deformable member 300 can vary. In one embodiment, the deformable member 300 can be in the form of a substantially planar plate that can be configured to deform or flex. Since the deformable member 300 can deform or flex, the deformable member 300 may not be completely planar and may include minor variations in the surface thereof. The deformable member 300 can be formed from a variety of materials that allow it to reversibly, elastically deform or flex. Suitable materials can include, for example, metals and metal alloys (e.g., steel, brass, aluminum, titanium) and polymers (e.g., polyethylene, polytetrafluoroethylene ($P_T$ FE), polyetheretherketone (PEEK)). As will be discussed in more detail below, the material properties and the dimensions of the deformable member 300 can be configured such that the deformable member 300 will only deform when forces applied thereto exceed a selected threshold pressure.

The deformable member 300 can include one or more openings or cut-outs formed therein. FIG. 4 illustrates a cut-out 302 formed in an outer periphery of the deformable member 300, however the cut-out(s) can be formed at any location. As discussed below, the cut-out(s) can allow fluid to flow through the deformable member 300. The cut-out(s) are not required and embodiments of the deformable member 300 may have no cut-outs.

Figure 5:
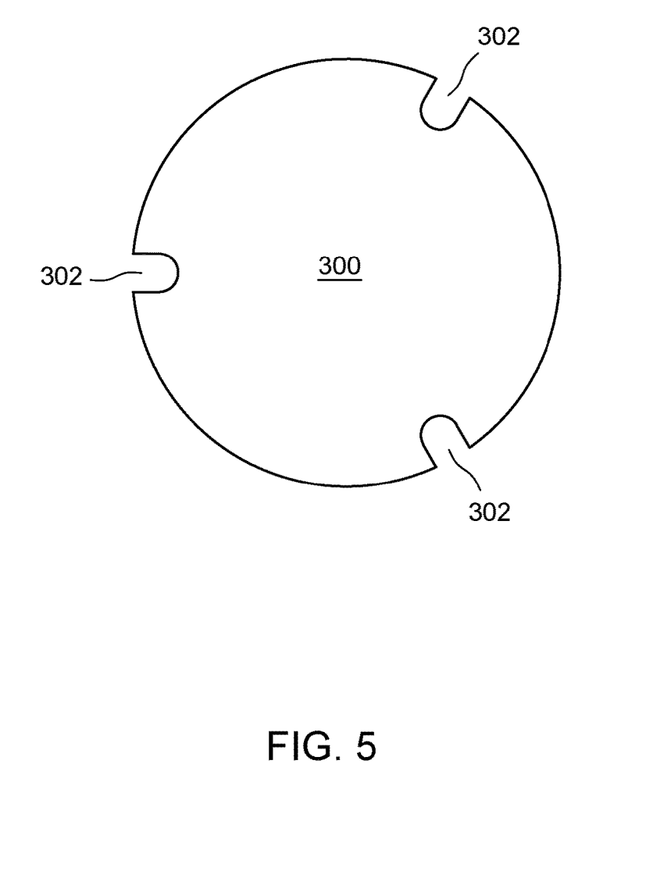
FIG. 5 is a top view of one exemplary embodiment of deformable member of the bi-directional valve of FIG. 3.

FIG. 5 is a top view of the deformable member 300, and as shown the deformable member 300 can include three cut-outs 302 spaced approximately equidistant from one another. The illustrated deformable member 300 has a circular shape for fitting in a circular cavity 206 formed in the first housing portion 204a, however the deformable member 300 and the cavity 206 can have any shape.

Figure 6:
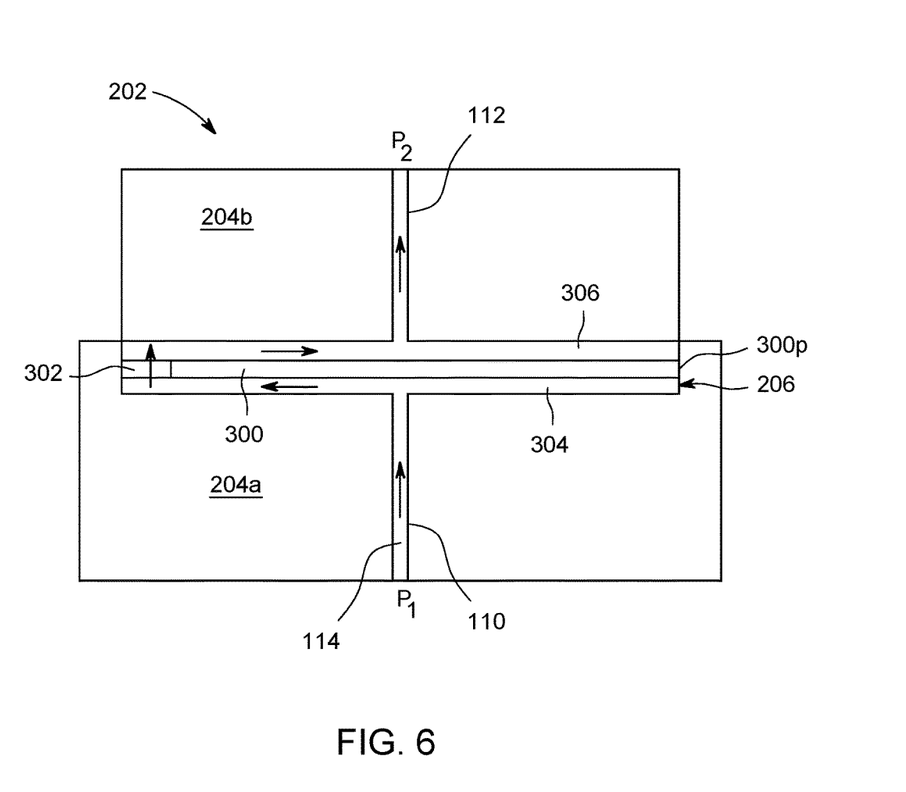
FIG. 6 is a schematic cross-sectional view of the bi-directional valve of FIG. 3 in an open configuration.
Figure 7:
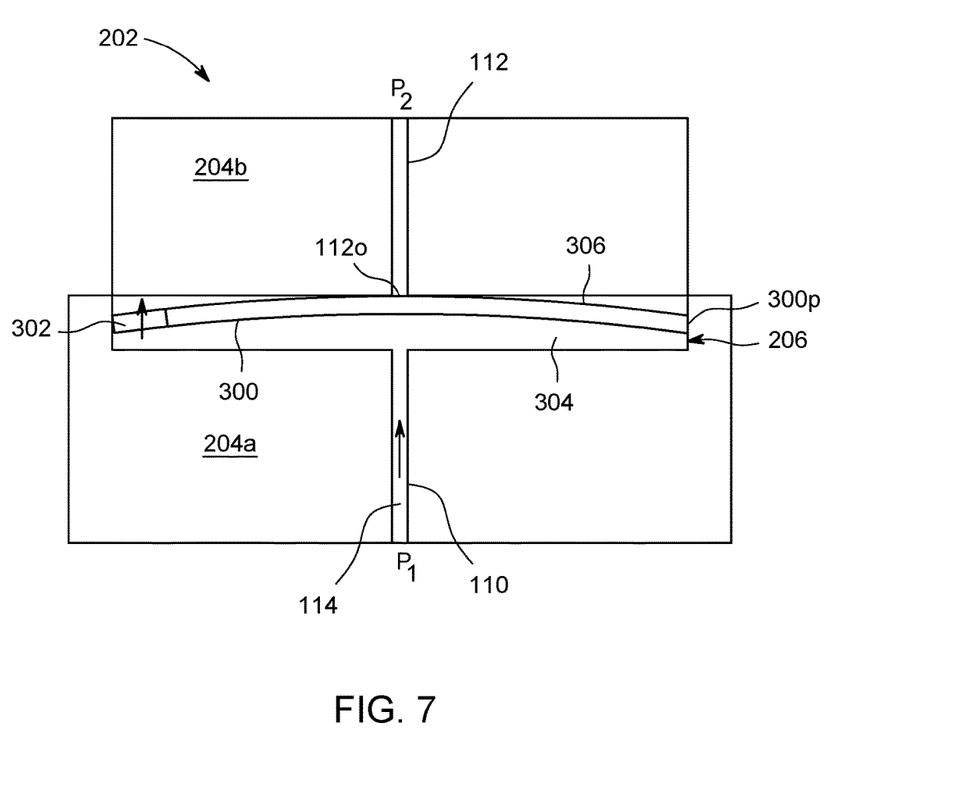
FIG. 7 is a schematic cross-sectional view of the bi-directional valve of FIG. 3 in a first closed position.
Figure 8:
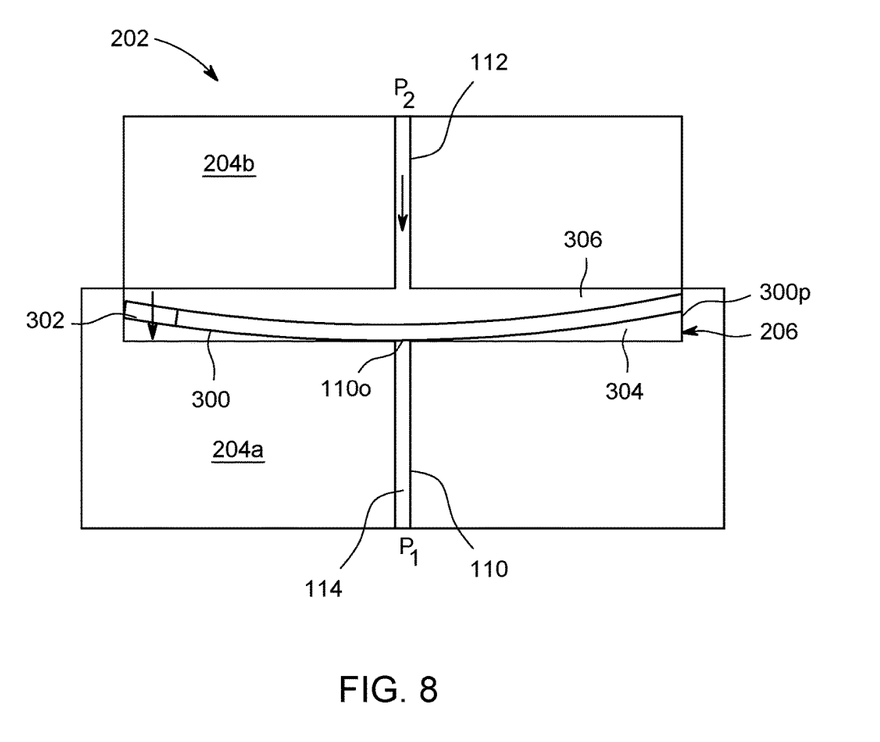
FIG. 8 is a schematic cross-sectional view of the bi-directional valve of FIG. 3 in a second closed position.

FIGS. 6-8 illustrate use of the deformable member 300 to control the flow of transmission fluid 114 between the first capillary 110 and the second capillary 112.

As shown in FIG. 6, the transmission fluid 114 flowing from the first capillary 110 into the first gap 304 can exert a first pressure $P_1$ on one side of the deformable member 300 tending to urge the deformable member 300 into the second gap 306. Conversely, the transmission fluid 114 flowing from the second capillary 112 into the second gap 306 can exert a second pressure $P_2$ on the opposite side of the deformable member 300 tending to urge the deformable member 300 into the first gap 304. In this embodiment, the first pressure $P_1$ can be greater than the second pressure $P_2$ and the transmission fluid 114 can flow from the first capillary 110, into the first gap 304, through the cut-out 302, into the second gap 306 and to the second capillary 112 where the transmission fluid 114 can flow to the pressure sensor (not shown in FIG. 6) for measurement. The transmission fluid 114 can alternatively flow in an opposite direction when the second pressure $P_2$ is greater than the first pressure $P_1$.

Since both the first and second pressures $P_1$, $P_2$ can act on the deformable member 300, the deformable member 300 can have a net pressure ΔP applied thereto. The net pressure ΔP, which can correspond to the net applied force, can be the difference between the magnitudes of the first and second pressures $P_1$ and $P_2$. In general, deformation of the deformable member 300 can occur towards the capillary containing whichever of the first pressure $P_1$ and second pressure $P_2$ is lower. In this embodiment, the magnitude of the net pressure ΔP can be less than or equal to the selected threshold pressure $P_T$ of the deformable member 300. As a result, the net pressure ΔP can be insufficient to cause the deformable member 300 to deform by an amount that can block the opening of the first capillary 110 or the opening of the second capillary 112 and the transmission fluid 114 can continue to flow between the first and second capillaries 110, 112. While FIG. 6 illustrates the deformable member 300 in a planar configuration, various amounts of deformation may occur under the illustrated operating conditions.

FIG. 7 illustrates an embodiment in which the first pressure $P_1$ is greater than the second pressure $P_2$, however the magnitude of the net pressure ΔP (e.g., $|P_1-P_2|$) can be greater than the selected threshold pressure $P_T$. Under this condition, the net pressure ΔP can cause the deformable member 300 to deform into the second gap 306, thereby moving from the planar configuration and assuming a first substantially non-planar configuration. The deformation can be sufficient to cause the deformable member 300 to deform by at least an amount equal to a height of the second gap 306. The deformable member 300 can thereby block a second opening 112o of the second capillary 112 to prevent flow of transmission fluid 114 between the interface region 202 and the second capillary 112.

The ability of the deformable member 300 to deform into the configuration shown in FIG. 7 can be useful where damage occurs to a portion of one of the first and second capillaries 110, 112. For example, if damage occurs to the second capillary 112, it can be exposed to a surrounding environment that has a pressure that causes the second pressure $P_2$ to decrease by an amount that causes the magnitude of the net pressure ΔP (e.g., $|P_1-P_2|$) to exceed the selected threshold pressure $P_T$. In such a situation, the deformable member 300 can be caused to deform and thereby form a seal across the second opening 112o of the second capillary 112 to prevent the transmission fluid 114 in the first capillary 110 from escaping into the surrounding environment. Such a configuration can also help prevent rupture of a process fluid seal, such as process fluid seal 108 in FIG. 1, since the first capillary 110 will not be subjected to the pressures in the surrounding environment due to the breach 116 in the second capillary 112.

FIG. 8 illustrates an embodiment in which the second pressure $P_2$ is greater than the first pressure $P_1$, however the magnitude of the net pressure ΔP (e.g., $|P_1-P_2|$) can be greater than the selected threshold pressure $P_T$. Under this condition, the net pressure ΔP can cause the deformable member 300 to deform into the first gap 304, thereby moving from the planar configuration and assuming a second substantially non-planar configuration. The deformation can be sufficient to cause the deformable member 300 to deform by at least an amount equal to a height of the first gap 304. The deformable member 300 can thereby block a first opening 110o of the first capillary 110 to prevent the flow of transmission fluid 114 between the first capillary 110 and the interface region 202.

The ability of the deformable member 300 to deform into the configuration shown in FIG. 8 can be useful where damage occurs to a portion of one of the first and second capillaries 110, 112. For example, if damage occurs to the second capillary 112, it can be exposed to a surrounding environment having a pressure that causes the second pressure $P_2$ to increase by an amount that causes the magnitude of the net pressure ΔP (e.g., $|P_1-P_2|$) to exceed the selected threshold pressure $P_T$. The deformable member 300 can be caused to deform and thereby form a seal across the first opening 110o of the first capillary 110 to prevent the transmission fluid 114 in the first capillary 110 from escaping into the surrounding environment. Such a configuration can also help prevent rupture of a process fluid seal, such as process fluid seal 108 in FIG. 1, since the first capillary 110 will not be subjected to the pressures in the surrounding environment flowing into the breach 116 in the second capillary 112.

The interface region 202, and in particular the dimensions of the first gap 304 and the second gap 306, as well as the deformable member 300, can be tailored to cause the deformable member 300 to move between the first configuration shown in FIG. 6, the second configuration shown in FIG. 7, and the third configuration shown in FIG. 8 for any selected threshold pressure $P_T$. Deformation of the deformable member 300 under a given pressure can be governed by the dimensions of the deformable member 300 and its elastic modulus. Thus, for a given range of pressures and dimensions of the first gap 304 and second gap 306, the deformable member 300 can be provided with dimensions and/or elastic modulus that will move between the various configurations shown in FIGS. 6-8 at a desired threshold pressure $P_T$.

The size of the interface region 202 (e.g., first gap 304, the second gap 306, the deformable member 300), the size and/or placement of the cut-outs 302 in the deformable member 300, and the first and second capillaries 110, 112 can each be independently optimized to reduce the volume of transmission fluid necessary to operate the bi-directional valve 200. In some embodiments, the sizes can be selected so that the volume of transmission fluid is as small as possible. Notably, variations in temperature and compressibility of the fluid can cause variations in the first and second pressures $P_1$ and $P_2$ independent from the fluid pressure in the portions of the first and second capillaries 110, 112 external to the housing 204. These variations can scale with the fluid volume and they can be minimized by employing a relatively low fluid volume within the bi-directional valve 200. In an exemplary embodiment, the length and diameter of the first capillary 110 and second capillary 112 can be approximately the same. In an exemplary embodiment, the height of the first gap 304 and the second gap 306 can be approximately the same.

Figure 9:
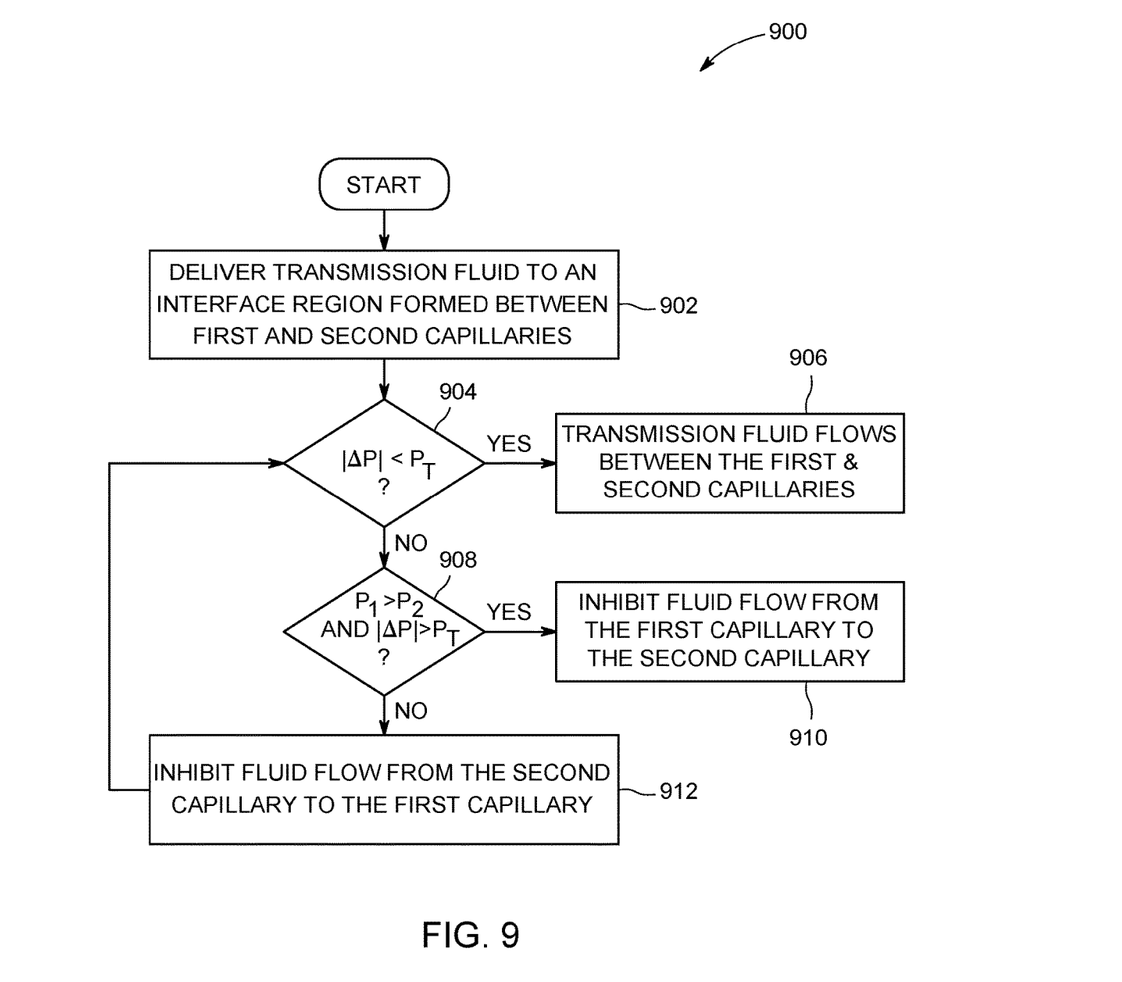
FIG. 9 is a flow diagram illustrating one exemplary embodiment of a method for controlling fluid flow in a fluid pressure sensing system.

FIG. 9 illustrates an exemplary embodiment of a method 900 for controlling fluid flow using a bi-directional valve. The method 900 is described in connection with the pressure sensing system 100 shown in FIG. 1, however the method is not limited to use with the system of FIG. 1 and can be used with any system. While not shown, where the bi-directional valve 200 can be separate from the process fluid channel 102, the first housing portion 204a can be coupled to the first capillary 110 such that the first capillary 110 can extend from the process fluid seal 108 to the interface region 202. Similarly, the second housing portion 204b can be coupled to the second capillary 112 such that the second capillary 112 can extend from the process fluid seal 108 to the interface region 202. The first and second capillaries 110, 112 can be formed from any number of interconnected tubes.

As shown in FIG. 9, in operation 902, a transmission fluid 114 can be delivered to an interface region 202 between the first capillary 110 and the second capillary 112. The fluid has a first pressure $P_1$ in the first capillary 110 and a second pressure $P_2$ in the second capillary 112. In operation 904, if the magnitude of the net pressure $\Delta P$ is less than or equal to a threshold $P_T$ at which the deformable member 300 in the bi-directional valve 200 will deform, the transmission fluid 114 can flow between the first and second capillaries, as shown in operation 906. In operation 908, if the magnitude of the net pressure $\Delta P$ is greater than the threshold pressure $P_T$, the transmission fluid can be prevented from flowing between the first capillary 110 to the second capillary 112. If the first pressure $P_1$ is greater than the second pressure $P_2$, then the second capillary 112 can be blocked, as shown in operation 910. If the first pressure $P_1$ is less than the second pressure $P_2$, then the first capillary 110 can be blocked, as shown in operation 912.

An exemplary technical effect of the methods, systems, and devices described herein includes, by way of non-limiting example, bi-directional shut-off of fluid flow in a pressure sensing system.

Certain exemplary embodiments have been described above to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

What is claimed is:

1. A valve for use in a pressure sensing system, comprising:
   a housing integrated within a process fluid channel associated with a subsea oil processing facility, the housing including a first capillary portion and a second capillary portion that are separated by an interface region formed in a sidewall of the process fluid channel; and
   a deformable member positioned within the interface region and configured to move between a first position and a second position when a magnitude of a pressure difference between the first capillary portion and the second capillary portion exceeds a threshold pressure, wherein the first position allows fluid communication between the first capillary portion and the second capillary portion, and the second position prevents fluid communication between the first capillary portion and the second capillary portion.

2. The valve of claim 1, wherein the deformable member is configured to deform during movement from the first position to the second position.

3. The valve of claim 1, wherein the deformable member includes at least one opening extending therethrough for allowing fluid flow therethrough when the deformable member is in the first position.

4. The valve of claim 3, wherein the deformable member is shaped as a substantially planar plate and the at least one opening comprises at least one cut-out formed in a perimeter of the deformable member.

5. The valve of claim 1, wherein the deformable member is substantially planar in the first position and is substantially non-planar in the second position.

6. The valve of claim 1, wherein the deformable member is spaced apart from the first capillary portion and the second capillary portion in the first position, and the deformable member blocks an opening into one of the first capillary portion and the second capillary portion in the second position to prevent fluid flow therethrough.

7. The valve of claim 1, wherein the deformable member is positioned within the interface region such that the deformable member is separated from the first capillary portion by a first gap and the deformable member is separated from the second capillary portion by a second gap.

8. The valve of claim 7, wherein the deformable member is configured to deform toward one of the first gap and the second gap in the second position to prevent fluid communication between the first capillary portion and the second capillary portion.

9. A fluid pressure sensing system, comprising:
   a housing integrated within a process fluid channel associated with a subsea oil processing facility;
   a first capillary extending from an interface region of a valve and configured to extend to a process fluid channel, the interface region formed in a sidewall of the process fluid channel;
   a second capillary extending between the interface region of the valve and a pressure sensor;
   a first seal configured to transmit a pressure of a process fluid contained within the process fluid channel to a transmission fluid contained within the first capillary; and
   a second seal at the interface region in hydraulic communication with the first capillary and the second capillary, the second seal being configured to,
      allow fluid flow between the first capillary and the second capillary when a magnitude of a pressure difference across the second seal is less than or equal to a threshold pressure, and
      prevent fluid flow between the first capillary and the second capillary when the magnitude of the pressure difference across the second seal is greater than the threshold pressure.

10. The fluid pressure sensing system of claim 9, further comprising the pressure sensor configured to measure the process fluid pressure when the fluid flows between the first capillary and the second capillary.

11. The fluid pressure sensing system of claim 9, wherein the first seal comprises a diaphragm seal.

12. The fluid pressure sensing system of claim 9, wherein the second seal is deformable and moveable between a first position and a second position, wherein the second seal allows fluid flow between the first capillary and the second capillary in the first position, and wherein the second seal prevents fluid flow between the first capillary and the second capillary in the second position.

13. The fluid pressure sensing system of claim 12, wherein the second seal is spaced apart from the first capillary and the second capillary in the first position, and the second seal deforms toward one of the first capillary and the second capillary to block fluid flow between the first capillary and the second capillary in the second position.

14. The fluid pressure sensing system of claim 12, wherein the second seal is substantially planar in the first position and is substantially non-planar in the second position.

15. The fluid pressure sensing system of claim 9, wherein the second seal comprises a deformable member having at least one opening extending therethrough for allowing fluid flow between the first capillary and the second capillary when a magnitude of a pressure difference across the second seal is less than or equal to a threshold pressure, the deformable member shaped as a substantially planar plate and the at least one opening including at least one cutout formed in a perimeter of the deformable member.

16. A method of controlling fluid flow in a pressure sensing system, comprising:
coupling a valve to a pressure sensing system such that a first capillary extends from the valve a process fluid channel associated with a subsea oil processing facility and a second capillary extends between the valve to a pressure sensor, the valve configured within a housing integrated within the process fluid channel, and the first capillary and the second capillary separated by an interference region formed in a sidewall of the process fluid channel;
wherein the valve allows a transmission fluid in the first capillary to flow between the first capillary and the second capillary to the pressure sensor when a magnitude of a pressure difference between the first capillary and the second capillary is less than or equal to a threshold pressure, and wherein the valve prevents flow of the transmission fluid between the first capillary and the second capillary when the magnitude of the pressure difference between the first capillary and the second capillary exceeds than the threshold pressure.

17. The method of claim 16, wherein the transmission fluid flows through at least one opening in a deformable member in the valve when the magnitude of the pressure difference between the first capillary and the second capillary is less than or equal to the threshold pressure.

18. The method of claim 16, wherein a deformable member in the valve deforms when the magnitude of the pressure difference between the first capillary and the second capillary exceeds the threshold pressure to prevent the transmission fluid from flowing between the first capillary and the second capillary.

19. The valve of claim 1, wherein the interface region is adjacent to a process fluid seal configured within the process fluid channel.

20. The method of claim 16, wherein the interface region is adjacent to a process fluid seal configured within the process fluid channel.

* * * * *